R. L. MORGAN.
RIM FOR MOTOR CAR WHEELS.
APPLICATION FILED MAY 9, 1916.
1,304,794.                                           Patented May 27, 1919.
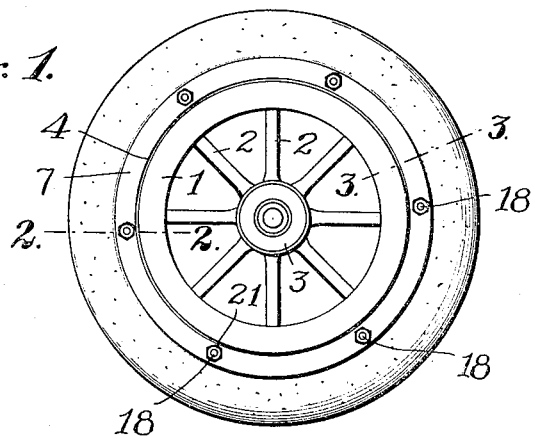
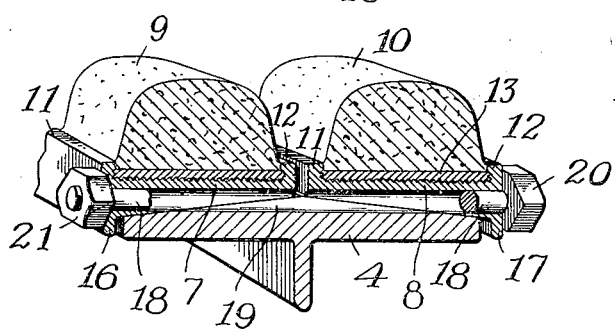
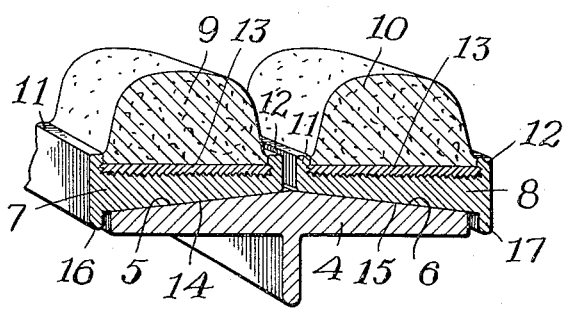
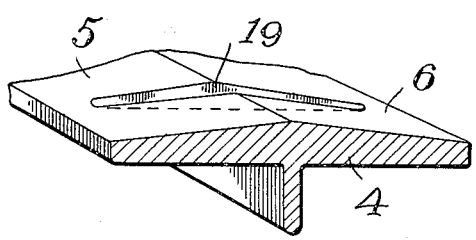
Inventor
Ralph L. Morgan
By Geo. H. Kennedy Jr.
Attorney

UNITED STATES PATENT OFFICE.

RALPH L. MORGAN, OF WORCESTER, MASSACHUSETTS.

RIM FOR MOTOR-CAR WHEELS.

1,304,794.  Specification of Letters Patent.  Patented May 27, 1919.

Application filed May 9, 1916. Serial No. 96,419.

*To all whom it may concern:*

Be it known that I, RALPH L. MORGAN, a citizen of the United States, residing at Worcester, in the county of Worcester and Commonwealth of Massachusetts, have invented a new and useful Improvement in Rims for Motor-Car Wheels, of which the following is a specification, accompanied by drawings forming a part of the same.

My invention relates particularly to a demountable rim for that class of motor vehicles for carrying heavy loads; and it has for its objects to simplify the construction of this class of wheel rims, by a reduction in the number of parts employed, and further, to provide a more substantial and unyielding support to the demountable rim. These objects, among others, I secure by the construction and arrangement of parts as hereinafter described, and illustrated in the accompanying drawings, in which—

Figure 1 represents a side view of a wheel fitted with my improved rim.

Fig. 2 is a transverse sectional view of a portion of the rim, the section being shown on the plane of the broken line 2—2, Fig. 1.

Fig. 3 is a transverse sectional view of a portion of the rim on the plane of the broken line 3—3, Fig. 1.

Fig. 4 is a sectional view of a portion of the felly rim, the demountable tire rims having been removed.

Similar reference characters refer to similar parts throughout the different views.

Referring to the accompanying drawings, 1, Fig. 1, denotes the felly of the wheel mounted upon the ends of spokes 2 radiating from the hub 3. Supported upon the outer periphery of the felly 1 is a felly-rim 4, consisting of an annular metal plate fitting the wheel felly and having its outer surface beveled in opposite directions from its center, as shown at 5, 6. Mounted upon the beveled surfaces 5 and 6 are annular channel plates 7 and 8 forming demountable rims carrying cushion tires 9 and 10. The channel plates 7 and 8 are provided at their upper edges with flanges 11 and 12 adapted to inclose the lower edges of the cushion tires 9 and 10 which are retained in position by the flanges 11, 12, and by a cementing material 13, such for example as vulcanized rubber, inserted between the cushion tires 9 and 10 and the outer surfaces of the channel plates 7 and 8. The channel plates 7 and 8 are provided with beveled under surfaces 14, 15, fitting the beveled surfaces 5 and 6 of the rim plate 4, when the channel plates 7 and 8 are placed in position with their opposing edges slightly separated.

The channel plates 7 and 8 are also provided with flanges 16, 17 overlapping the edges of the rim plate 4, but slightly separated therefrom. The flanges 11, 16 and the flanges 12, 17 extend the outer surfaces of the channel plates to form suitable bearings for the clamping bolts 18 which are inserted through spaced holes in the channel plates 7 and 8, said holes being formed in alinement with the bolt holes of the channel plates and cutting the apex of the beveled surfaces 5 and 6 forming a transverse recess 19 at the center of the annular rim plate 4. The channel plates 7 and 8 are slipped upon the beveled surfaces of the rim plate 4 from opposite sides of the wheel, with the bolt holes in the channel plates in registration with each other. The bolts 18 are then inserted, with the head 20 of the bolt bearing against the outer edge of the channel plate 8, and with a nut 21 applied to the opposite screw threaded end of the bolt 18 and bearing against the outer surface of the channel plate 7. By screwing up the nuts 21 the channel plates are drawn toward each other and up the inclined surface of the rim plate 4 until they form a solid bearing thereon. By the employment of the two channel plates 7 and 8 and the cushion tires 9 and 10, the wheel is provided with twin tires, as is common with the rear of driving wheels of motor vehicles. If desired, however, a single one of the channel plates may be employed, in which case the rim plate 4 will be correspondingly narrower, and provided with a single peripheral beveled surface.

I am aware it is not new to employ oppositely beveled tire supporting plates fitting an oppositely beveled felly-rim plate and clamped by a series of spaced bolts, and I do not claim such broadly.

By my present construction I reduce the weight of the tire plates by giving them a slight bevel, making it convenient to apply and remove them from the wheel which is a desirable feature in a demountable rim, and I provide clamping surfaces by forming exterior and interior flanges at the outer edges of the channel plates. By duplicating the exterior flange at the inner edge of the channel plate, I provide a secure seat for the tire between the flanges 11 and 12, while the interior flanges 16 and 17 coöperate with the exterior flanges at the outer edges of the channel plates to provide clamping surfaces for the bolts.

I claim:

The combination of an annular felly rim having its outer surface beveled in opposite directions on opposite sides of its center and having a series of spaced notches at the apex of said beveled surfaces, a pair of annular channel plates interiorly beveled to fit the exteriorly beveled surface of the felly rim and applied to said exterior beveled surfaces with an open space between their inner edges, right angled flanges projecting outwardly from the outer and inner edges of said channel plates, right angled flanges projecting inwardly from the outer edges of said channel plates and overlapping the rim plate, screw threaded clamping bolts lying in the notches of the rim plate, heads carried by one end of said bolts and nuts carried by the opposite ends of said bolts, said heads and nuts bearing against the flanges at the outer edges of said channel plates, and tires held between the outwardly projecting flanges of said channel plates.

RALPH L. MORGAN.

Witnesses:
 NELLIE WHALEN,
 PENELOPE COMBERBACH.